(12) United States Patent
Gupta et al.

(10) Patent No.: US 8,645,335 B2
(45) Date of Patent: Feb. 4, 2014

(54) PARTIAL RECALL OF DEDUPLICATED FILES

(75) Inventors: Abhishek Gupta, Seattle, WA (US); Ran Kalach, Bellevue, WA (US); Chun Ho Cheung, Redmond, WA (US); James Robert Benton, Seattle, WA (US); Joerg-Thomas Pfenning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 12/970,848

(22) Filed: Dec. 16, 2010

(65) Prior Publication Data
US 2012/0158675 A1 Jun. 21, 2012

(51) Int. Cl.
*G06F 7/00* (2006.01)
*G06F 17/00* (2006.01)

(52) U.S. Cl.
USPC ........................................... 707/692; 707/693

(58) Field of Classification Search
None
See application file for complete search history.

(56) References Cited

U.S. PATENT DOCUMENTS

| 7,401,080 | B2 | 7/2008 | Benton |
| 7,519,635 | B1 | 4/2009 | Haustein |
| 7,814,074 | B2 | 10/2010 | Anglin |
| 2009/0204650 | A1* | 8/2009 | Wong et al. ................ 707/204 |
| 2009/0271454 | A1 | 10/2009 | Anglin |
| 2009/0313248 | A1 | 12/2009 | Balachandran |
| 2010/0036887 | A1 | 2/2010 | Anglin |
| 2010/0070478 | A1 | 3/2010 | Anglin |
| 2010/0082672 | A1 | 4/2010 | Kottomtharayil |
| 2010/0088277 | A1 | 4/2010 | Rao |
| 2010/0088296 | A1 | 4/2010 | Periyagaram |
| 2010/0174881 | A1 | 7/2010 | Anglin |
| 2010/0199065 | A1 | 8/2010 | Kaneda |
| 2010/0235332 | A1 | 9/2010 | Haustein |
| 2010/0241654 | A1 | 9/2010 | Wu |
| 2010/0250501 | A1 | 9/2010 | Mandagere |
| 2010/0299311 | A1* | 11/2010 | Anglin et al. ................ 707/640 |
| 2010/0313036 | A1 | 12/2010 | Lumb |
| 2011/0071989 | A1* | 3/2011 | Wilson et al. ................ 707/692 |
| 2011/0125722 | A1 | 5/2011 | Rao |
| 2011/0138154 | A1 | 6/2011 | Tevis |

OTHER PUBLICATIONS

Achieving Storage Efficiency with Data Deduplication, 2008, http://www.dell.com/downloads/global/products/pvaul/en/nx4-dedup.pdf, 17 pages.
Decentralized Deduplication in SAN Cluster File Systems, 2010, http://www.scs.stanford.edu/~jinyuan/dede.pdf, 18 pages.

(Continued)

*Primary Examiner* — Uyen Le
(74) *Attorney, Agent, or Firm* — Gonzalez Saggio & Harlan LLP

(57) ABSTRACT

The subject disclosure is directed towards changing a file from a fully deduplicated state to a partially deduplicated state in which some of the file data is deduplicated in a chunk store, and some is recalled into the file, that is, in the file's storage volume. A partial recall mechanism such as in a file system filter tracks (e.g., via a bitmap in a file reparse point) whether file data is maintained in the chunk store or has been recalled to the file. Data is recalled from the chunk store as needed, and committed (e.g., flushed) to the file. Also described is efficiently returning the file to a fully deduplicated state by using the tracking information to determine which parts of the file are already deduplicated into the chunk store so as to avoid their further deduplication processing.

20 Claims, 10 Drawing Sheets

(56) References Cited

OTHER PUBLICATIONS

How to Use Duplic8, Apr. 28, 2008, 10 pages.
DEBAR: A Scalable High-Performance De-duplication Storage System for Backup and Archiving, Tianming Yang, et al., Apr. 23, 2010, 19 pages.
Permabit launches Albireo data deduplication for primary data reduction, Jun. 7, 2010, 10 pages.
Permabit Albireo™ High-Performance Data Optimization Software, Sep. 2010, 5 pages.
Extreme Binning: Scalable, Parallel Deduplication, Deepavali Bhagwat, et.al., Sep. 2009, 9 pages.
FBBM: A new Backup Method with Data De-duplication Capability, 2008, 6 pages.
Is data deduplication the best capacity optimization tool? Feb. 26, 2009, 5 pages.
Data Deduplication and its Benefits, Sep. 9, 2009, 7 pages.
Symantec Advocates Data Deduplication as Part of an Overall Backup Strategy, May 1, 2007, 2 pages.
HP StoreOnce: reinventing data deduplication, 2010, 14 pages.
Transform Your Backup Through Data De-Duplication, 2010, 2 pages.
"International Search Report", Mailed Sep. 10, 2012 Application No. PCT/US2011/065658, Filed Date Dec. 16, 2011, pp. 1-8.

* cited by examiner

PARTIAL RECALL OF DEDUPLICATED FILES

BACKGROUND

Data deduplication (sometimes referred to as data optimization) refers to eliminating redundant data in storage systems and thereby reducing the physical amount of bytes of data that need to be stored on disk or transmitted across a network, without compromising the fidelity or integrity of the original data. By reducing the resources needed to store and/or transmit data, data deduplication thus leads to savings in hardware costs (for storage) and data-managements costs (e.g., backup). As the amount of digitally stored data grows, these cost savings become significant.

Data deduplication typically uses a combination of techniques for eliminating redundancy within and between persistently stored files. One technique operates to identify identical regions of data in one or multiple files, and physically store only one unique region (chunk), while maintaining a reference to that chunk in association with the file. Another technique is to mix data deduplication with compression, e.g., by storing compressed chunks.

The data of deduplicated files are thus stored in chunks or compressed chunks in a chunk store, where the files themselves are left as "stubs" comprising references to the chunks. When a user or an application needs to access a deduplicated file, a deduplication engine brings the data back into memory (referred to as rehydration) or to disk (referred to as recall). When a user or an application modifies that data, parts of the old optimized data may be needed to ensure data consistency and integrity.

The process of rehydration or recall introduces latency in data access because of the need to (possibly) decompress chunks, because of file fragmentation that is introduced by chunking, and because of the chunk store's location/implementation. Full file recall introduces high latency and relatively considerable I/O overload. When the file is large, the latency and resource consumption problems worsen.

Further, when a full large file has been recalled, the deduplication engine may need to again deduplicate the file. This requires a lot of resources and affects overall data deduplication throughput, which is also a challenge considering the large amount of data a typical deduplication system needs to manage.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which data of a file is managed such that the file may be in a partially deduplicated state, in which some of the file data is deduplicated in a chunk store, and some of the file data is recalled into the file, that is, to the file's storage volume in place of a reference to the chunk store. A file may be changed from a fully deduplicated state to a partially deduplicated state when a range of data is written. This change is made by reading chunks from a chunk store, and committing (e.g., flushing) at least part of the chunks to the storage volume or other media that contains the file as recalled ranges. Tracking information is maintained in association with the file (e.g., in a reparse point) to track which ranges of data have been recalled, and which reside in the chunk store. The tracking information is accessed to return data from the proper source as needed.

In one aspect, the chunks may be read to obtain more data than is needed, such as to align with file system allocation boundaries, and/or in anticipation of a need to access the additional data. For example, the file may be divided into fixed size partitions, with any partition containing recalled data being fully filled up to the partition's boundaries.

In another aspect, the tracking information may be maintained as metadata of a deduplicated file, e.g., as a bitmap-related (auxiliary) structure having one bit per partition to indicate whether the partition contains recalled file data or the data resides in the chunk store. The tracking information may be maintained in a reparse point buffer, an alternate data stream, or any other means that the file-system provides to store metadata on a file. The metadata may be stored in a limited amount of space. If more space is needed, the data in the bitmap-related structure may be used to represent more than one partition, and/or may be compressed (e.g., encoded) to reduce the space consumed. File data may be recalled to make the compression more efficient.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards recalling partial portions (ranges) of a deduplicated file as opposed to recalling the entire file, which provides performance benefits relative to full file recall, particularly when the file is large. To this end, aspects of the technology provide for the implementation and tracking of recalled ranges in memory and/or on-disk, in an I/O efficient manner. The technology also facilitates the re-deduplicating of a partially-recalled file by scanning and streaming only the recalled file ranges (as opposed to the entire file), thereby saving machine resources and increasing deduplication throughput.

To accomplish partial deduplication, various mechanisms and optimizations are provided, including mechanisms and optimizations directed towards adjusting recalled file-ranges, I/O types, and minimizing flushes. A compressed bitmap structure to track recalled ranges also may be utilized.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
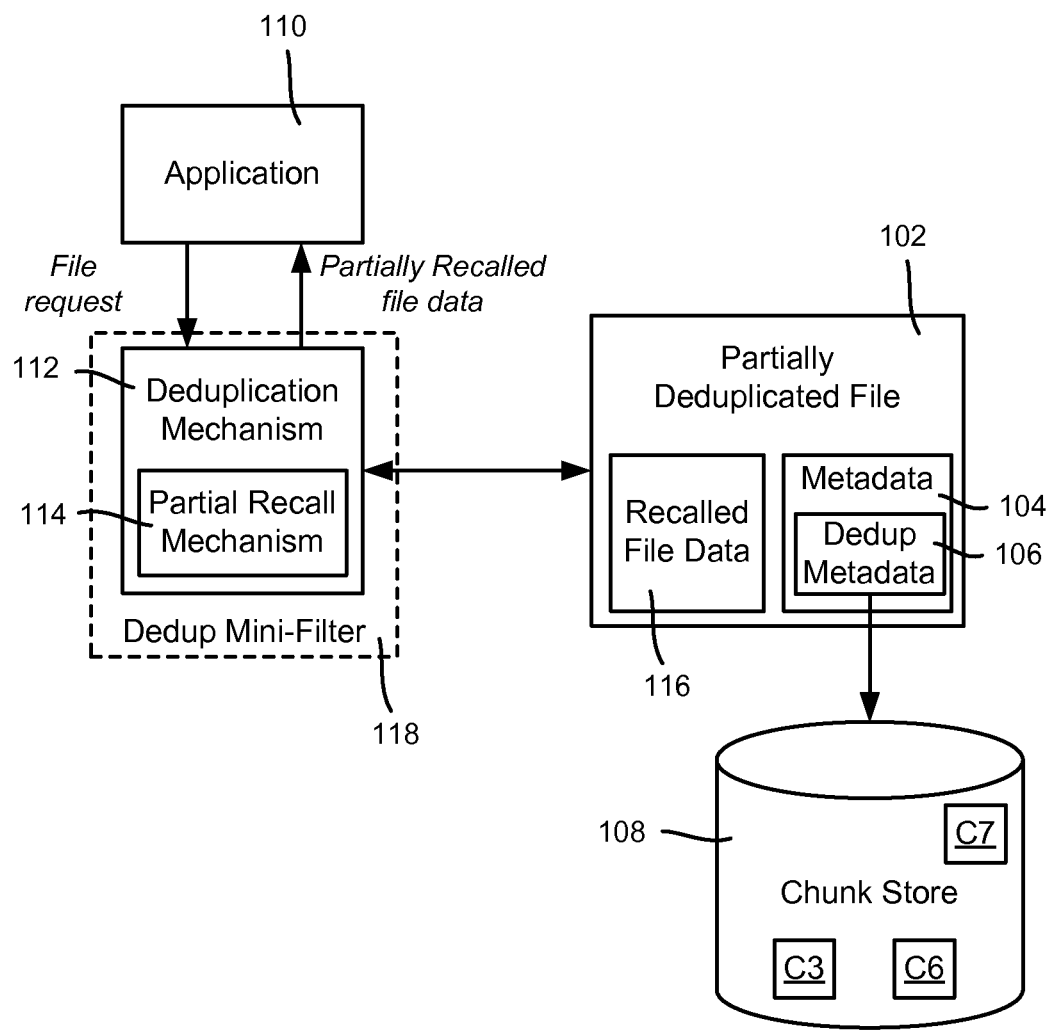
FIG. 1 is a block diagram representing example components for recalling ranges of a deduplicated file into a partially deduplicated file and/or accessing the data of a partially deduplicated file.

FIG. 1 shows example concepts of partial recall of a deduplicated file 102. In general, when a file is fully deduplicated, the file is associated with metadata 104 including deduplication (dedup) metadata 106 that maps the file's chunks (e.g., C3, C6 and C7) in the chunk store 108 back to the logical file. In general, when an application 110 requests to access the file, a deduplication mechanism 112 (e.g., implemented in a file system filter) accesses the referenced chunks (or chunk if only one) in the chunk store 108, and returns the chunks as recalled file data, after any decompression as appropriate. From the perspective of the application 110, the data is intact, and thus except for latency the user of the application 110 does not know or care whether the file was ever deduplicated or not.

There are various operations that cause a file to change from being in a deduplicated state to a non-deduplicated state. This includes when a user or process writes to the file, such that the modified file data at the written offset location no longer matches the chunk or chunks that had previously contained the data. Fully recalling the entire file to support such a file modification is often inefficient.

As described herein, a partial recall mechanism 114 is provided that allows only relevant chunks to be recalled, leaving the deduplicated file in a partially deduplicated state (the partially deduplicated file 102), containing some recalled file data 116 as well as references to the chunks that have not been recalled. For example, in FIG. 1, consider that only chunk C7 is recalled/its corresponding data is written to (dirtied). The file 102 (e.g., once the data is committed to disk or other stable storage) contains the recalled chunk's data in its recalled file data 116 as modified by the write; the deduplication metadata 106 is updated to reflect this partial recall state so as to know the file 102 contains the recalled data, and so as to no longer point to the now-outdated chunk C7. Note that a partially deduplicated file can be changed back to a fully deduplicated file state as described below, or fully recalled into a non-deduplicated state.

Thus, partial recall in general refers to recalling less than all the chunks, generally those that are relevant to a change, and tracking which part or parts of the file have been recalled and which remain in deduplicated chunks. A file thus may exist in a non-deduplicated state, a partially deduplicated (partial recall) state, or a fully deduplicated state.

In one implementation, the deduplication mechanism 112 is implemented as a file system filter 118, with the partial recall mechanism 114 incorporated as a subcomponent (e.g., lines of software code) of the deduplication mechanism 112. As described herein, the partial recall mechanism 114 performs the various tracking operations, including maintaining tracking data, as to which parts of a file have been recalled and which remain in chunk store chunks.

In one implementation, corresponding to a Microsoft® NTFS configuration, the tracking data is maintained in an NTFS reparse point, which also notifies the filter 118 that the file is partially deduplicated. Reparse points are well known in other usage scenarios, and are not described herein in detail. Note that a reparse point is only one alternative; other metadata/streams alternatively may be used for tracking purposes. In general, any way of associating metadata with a file, including via a reparse point, a stream, a database lookup, and so forth may be used to provide access to deduplication metadata.

When recalling data, a number of policy options are available that are generally file system dependent. For example, NTFS based deduplication may use sparse files that have space allocations in multiples of fixed cluster sizes (e.g., 64 k cluster sized blocks). In such implementations the file's deduplicated chunk sizes may not align with the data allocation sizes of the file-system. As an example, a file may have deduplicated chunks of 100K and 28K (totaling 128K) whereas NTFS may store it in two clusters of 64K (total 128K).

Figure 2:
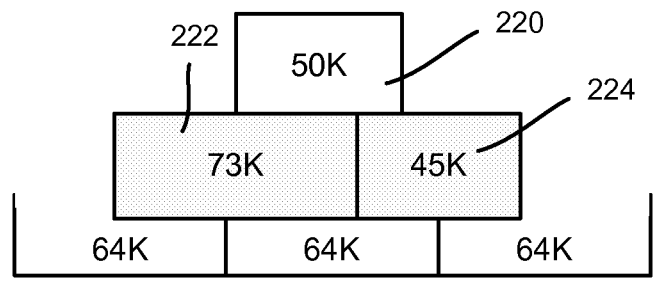
FIG. 2 is a representation of how chunks containing a range of data may be recalled and aligned on disk.

Thus, due to such discrepancies when a user writes to some size chunk (e.g., a 100K) it is often required to recall more data (e.g., 128K). By way of example, consider that a user requests access to a 50K data range, as shown in FIG. 2 by the data range 220. However, this does not line up with the chunks that contain the data range 220, and thus two chunks 222 and 224 need to be recalled to provide the full range of requested data. Note that in this example, the chunks are not of a fixed size, however fixed-size chunks are used in many implementations. Further, consider that for a sparse file, the file system allocates 64K of space at a time as needed for data writes, which as shown in FIG. 2 also does not align with the chunks. (A file system that supports variable ranges may not have such issues).

There are thus a number of options that are available, including bringing into memory only the chunks that the user needs. In this case, there is more data than needed, but not enough to fill the three 64K allocations. All of the chunk data can be written to disk, with the unwritten other parts of the allocated space filled with zeros. Alternatively, only the 50K of chunk data that is needed, plus any other chunk data up to the 64K allocation boundaries, may be kept, thus needing only 64K of space to be allocated, and then fully filling that 64K allocation in the example of FIG. 2.

Figure 3:
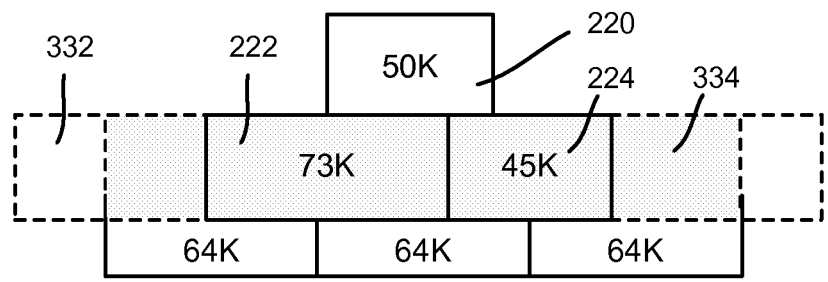
FIG. 3 a representation of how chunks containing a range of data plus additional chunks may be recalled and aligned on disk.

In another alternative shown in FIG. 3, more chunks than needed for the 50K range may be requested (chunks 222 and 224, along with chunks 332 and 334), such that the chunk 222 and the chunk 224 are fully on disk. Note that for chunks 332 and 334 only the parts that fall within the 64K boundaries are kept so at to fully utilize the space allocated by the file-system.

Thus, it is a policy choice as to how to deal with the extra data or space, which can be used to minimize latency and I/O, e.g., by allocating and filling more space than needed if it is anticipated that writes to the extra space are likely to be beneficial. As can be seen from the examples of FIGS. 2 and 3, one policy implementation saves writes based on fixed sector aligned boundaries, throwing away any unneeded chunk data that is outside the boundaries. One policy implementation reads enough data to fully fill each allocated range of the sparse file. (One implementation does both of these policy actions with respect to handling chunk data.)

Turning to aspects related to tracking the recalled data versus the data in the chunk store, the maintained tracking data has various aspects, which may be file system dependent. For example, one file system may only allocate needed file space for a sparse file, whereby such a file system may by itself be sufficient to track what has been recalled and what has not. However, NTFS does not guarantee that it will not allocate more sparse file ranges than needed, and thus in an NTFS implementation, the filter 118 needs a way to track which partitions (e.g., at 64 KB boundaries corresponding to sparse file allocations) are recalled to the partially deduplicated file, and which partitions remain as deduplicated chunks.

Figure 4:
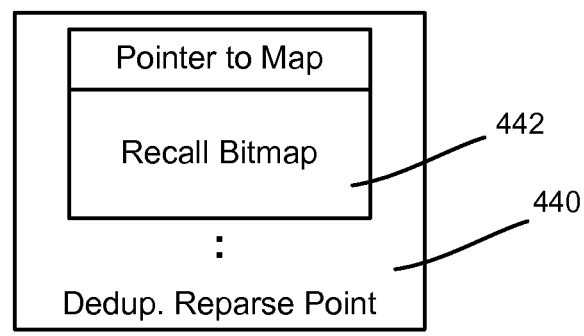
FIG. 4 is a representation of a deduplication reparse point including a buffer that contains a recall bitmap for tracking which ranges of a partially deduplicated file have been recalled, and which remain in the chunk store.

In one implementation generally represented in FIG. 4, an NTFS reparse point 440 is used for tracking. The reparse point 440 maintains a bitmap structure 442 or a compressed representation thereof. More particularly, in order to partially recall the file, the deduplication filter 118 creates a virtual partitioned view of the file, with the partitioning done at a pre-determined boundary, e.g., at a 64K boundary. The filter 118 maintains this partitioned view in the bitmap structure in the reparse point buffer; e.g., a set bit in the bitmap indicates that a partition has been recalled to the deduplicated file, whereas a zero bit indicates that the partition resides in the chunk store. The size of the partition can be added while setting the reparse point.

In a reparse point implementation, the bitmap is limited in size. If the file grows too large, then the bitmap cannot track individual partitions using one bit per partition. Described herein are various ways to adapt the bitmap in this situation.

One way to adapt the bitmap is to use one bit to represent multiple partitions, and consistently access each set of multiple partitions together as an indivisible unit. For example, if a bit represents a 2-partition unit, then with 64K partitions, each partition is recalled as part of a 128K unit, and so on.

Another way to adapt the bitmap is to compress the bitmap in the reparse point, and decompress the bitmap into memory as needed to access it. For example, run-length encoding is one well-known compression technique suitable for bitmap run lengths of ones and zeros.

Note that if compression can no longer reduce the compressed bitmap size, select partitions can be recalled to make more of the recalled partitions contiguous and thereby improve compression efficiency so that the compressed bitmap size fits into the reparse point's allowed space. For example, consider a long run of mostly one bits occasionally interrupted by zero bits. If the chunks corresponding to the occasional zero bits are recalled, then run length encoding can represent a much longer run of one bits in a single run-length representation.

Note that the data is recalled at one time, and the bitmap updated at another time, which leads to possible crash-related inconsistency. As described herein, when committing (e.g., flushing) the data to stable storage (e.g., disk or the like), the ordering of operations makes the system crash consistent. More particularly, a change to the bitmap is only flushed to disk after the corresponding data that it represents has been flushed to disk. In this way, the bitmap never indicates that the data has been partially recalled until that data is known to be safely flushed to disk. Note that if a disk and file system support write-through, write-through may be used instead of flush. Note that while flushing file data/metadata to disk is typically used as an example herein, this is only an example. Thus, "committing to stable storage" also includes the concept of file system and storage media write-through (as well as the concept of using file system and storage media flushing or any other means).

In another aspect, the tracking data may be used to efficiently convert a partially recalled file back to a fully deduplicated file. To this end, when a file is being scanned for deduplication, the tracking data may be used such that only the partially recalled file ranges are provided to the deduplication system for deduplication. As those ranges are added to the chunk store, the deduplication metadata including the tracking data are then adjusted to reflect that the recalled ranges are now optimized chunks and no longer partially recalled ranges.

By way of an example of one implementation, in order to partially recall a file, the deduplication filter 118 creates a virtual partitioned view of the file. The partitioning may be done at a fixed sector aligned boundary, e.g., at a 64K boundary. The filter maintains this partitioned view in the bitmap structure 442 in the buffer of the reparse point 446. The size of the partition can be added while setting the reparse point.

Figure 5:
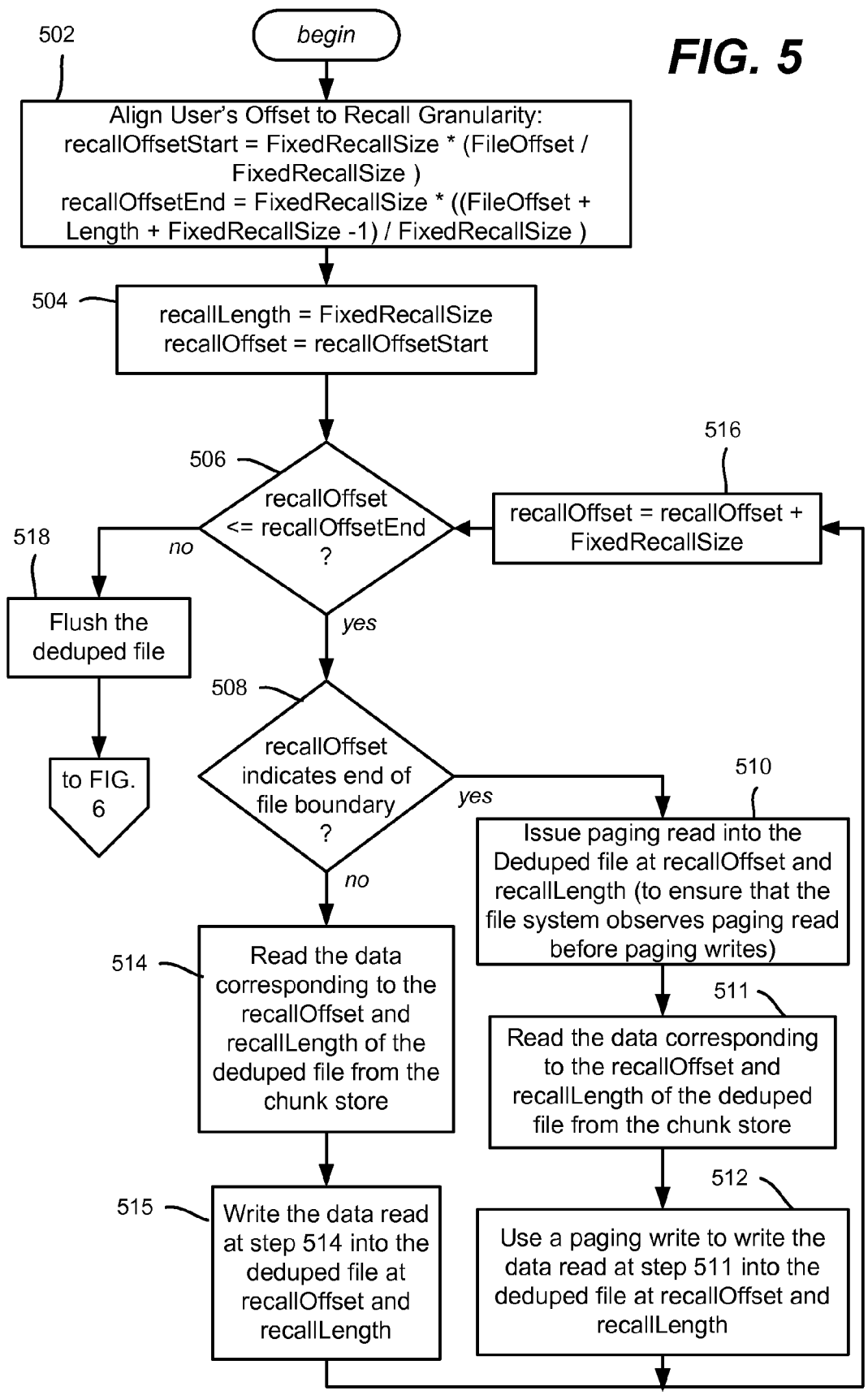
FIGS. 5 and 6 comprise a flow diagram representing steps of a partial recall algorithm used in one example implementation.
Figure 6:
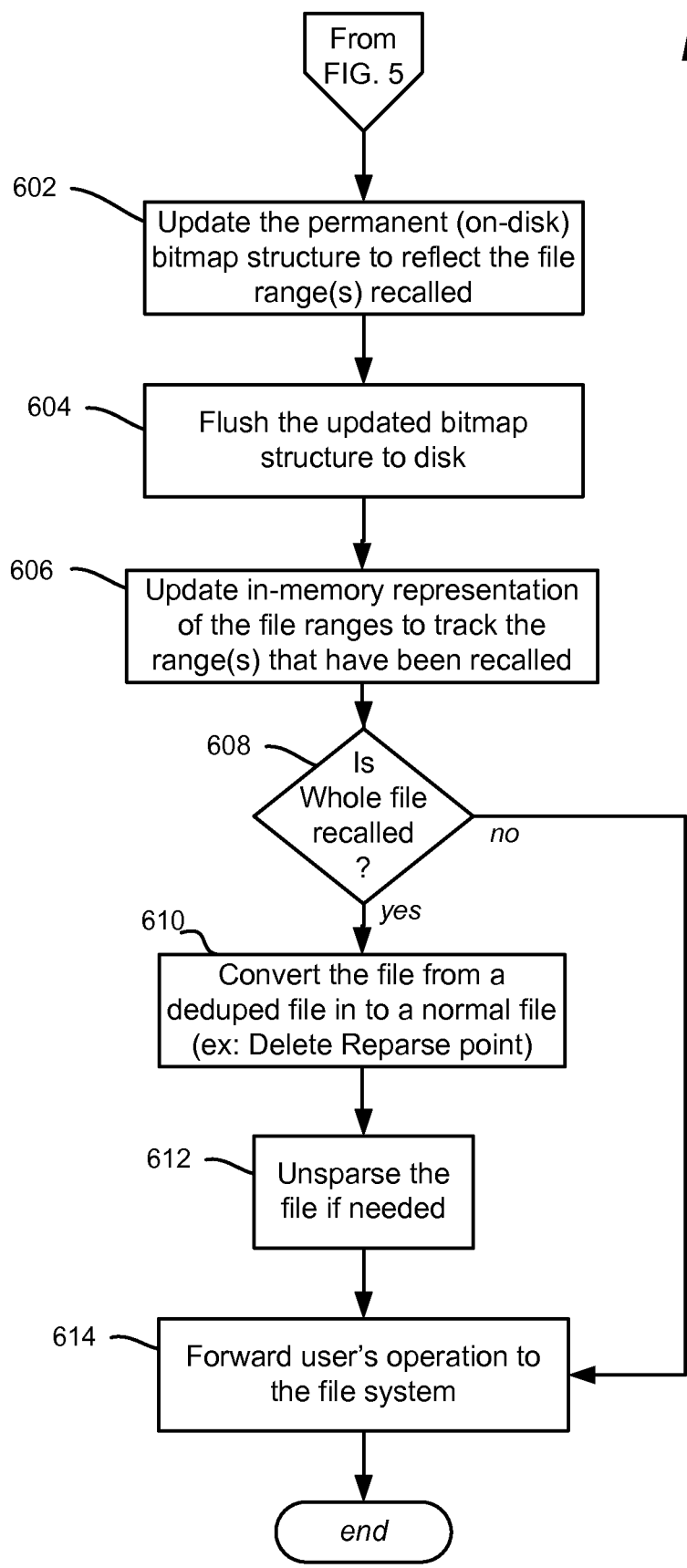

FIGS. 5 and 6 comprise a flow diagram representing example steps of one implementation of a partial recall mechanism, in which the chunks are fixed size, the bitmap structure is maintained in the reparse point buffer, and so on. FIG. 5 starts when a recall operation is needed, given RecallOperation(FileObject, FileOffset, Length) parameters, and obtaining the fixed chunk size for recall from the reparse point, e.g., FixedRecallSize=ReparsePoint→FixedSizeForRecall (may need to be sector aligned).

Step 502 represents aligning the user's file offset based on the granularity available, e.g., recallOffsetEnd=FixedRecallSize*((FileOffset+Length+FixedRecallSize−1)/FixedRecallSize); note that the "/" symbol implies integer division, which rounds down the answer to its nearest integer value. Step 504 initializes the recall loop, that is, recallLength=FixedRecallSize and recallOffset=recallOffsetStart.

Steps 506-516 are generally directed to filling in the range (including by computing the first and last aligned offset), which is performed by reading and writing operations, and looping until the recall offset is less than or equal to the recall offset end. At that time, step 506 branches to step 518 to flush the recalled portion of the deduplicated file to disk, and the process continues to FIG. 6 as described below.

Step 508 represents an end-of-file evaluation to ensure that the recall operation itself does not increase the logical file size. If the recall offset indicates that the process is about to recall the final chunks from the end of the file then the process may use a paging I/O technique as represented by steps 510-512. By using this technique, data may be recalled from the end of file using a non-buffered handle and still not extend the size of the file (note that using paged I/O is only one example that can be used with NTFS, and alternative techniques may be used). Thus, if at step 508 the write is at the logical end of the file, then steps 510-512 perform a recall via paging write operation, that is, issue a paging read to ensure that the file system observes paging read before paging writes, reading the data from the chunk store, and writing the data to the partially deduplicated file.

For a non-end-of-file situation, steps 514 and 515 are performed to read the data from the chunk store, and write the data to the partially deduplicated file.

Note that the chunk store data may be read in a cached manner (steps 511 and 514). However, while doing the recall, to reduce duplication in the system cache, the writes to the deduplicated file may be non-cached, as in step 515. If the recall boundaries are sector aligned then the process automatically satisfies a file-system requirement of doing sector aligned I/O during non-cached reads and writes. This is dynamically configurable by querying the file-system for the sector size of the volume and then partitioning the file into reasonable sized sector aligned chunks for recall purposes.

Returning to step 506, when the recall offset is less than or equal to the recall offset end, the recalled portion is flushed to disk at step 518. The process then continues to FIG. 6.

Step 602 of FIG. 6 represents updating the bitmap structure in the reparse buffer. Once updated, step 604 is performed for crash consistency, namely flushing the per chunk bitmap structure. Note that if this structure is a reparse point or the like, which is a part of the file, then the structure gets flushed as part of flushing the file in step 518 of FIG. 5, and therefore as an optimization it may be acceptable to bypass step 604.

Step 606 is performed to update an in-memory representation of a deduplicated file's data ranges. An in-memory representation is used to provide efficiency of lookup and it makes it faster to decide what part of the file has been recalled and what part still lies in the chunk store. Note this implies that there are two representations of the state of a deduplicated file's data ranges; one of these representations is permeated to disk in the form of structures similar to reparse points on NTFS, whereas the other representation is kept in memory for quick lookup.

In one deduplication implementation, a data structure referred to as the MCB (Memory control block) is maintained per deduplicated file. This structure resides in another per deduplication stream structure referred to as the stream context.

If at step 608 the whole file is dirty, then the state of the file is changed back to a non-deduplicated file. To this end, step 610 deletes the reparse point (in this example implementation), and if the file was not sparse originally, then step 612 marks the file as not sparse ("unsparses" it).

At this time, whether the file state is partially deduplicated or non-deduplicated, this recall operation is complete from the perspective of the filter 118. Step 614 forwards the user's modification request towards the file-system, e.g., to the file system or another filter, such as via an intermediary filter manager.

Figure 7A:
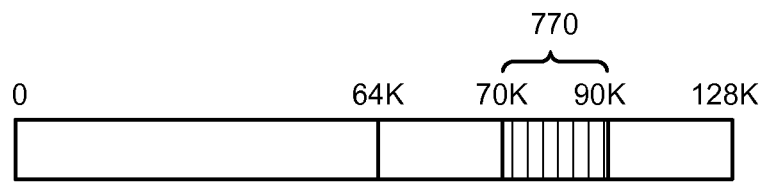
FIGS. 7A-7C are representations of how partially deduplicated file data may be recalled and written back with user data in an alternative example implementation.
Figure 7B:
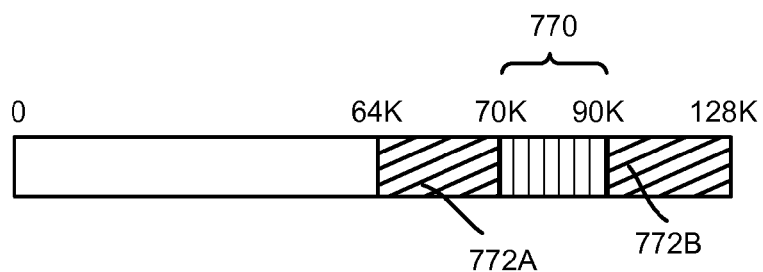
Figure 7C:
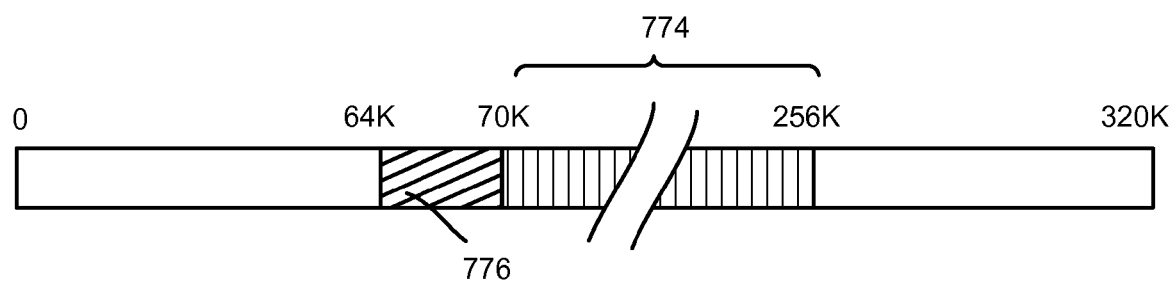

FIGS. 7A-7C describe an alternative implementation in which all of the data corresponding to the user's write may not be recalled. In this implementation, upon receiving a user's modification/write request, the partial recall mechanism retrieves only those parts of the optimized data that are required to bring the recalled parts of the file in line with a pre-determined recall boundary. This is achieved by first allowing the user's write to go to the file-system and then examining the range of the user's write to determine what parts of the range do not align to the recall boundary. The range will then be aligned to the recall boundary by prefixing and suffixing the range with appropriate optimized data.

Once the optimized data has been recalled the file is flushed and its bitmap is updated. The key advantage here is that lesser amount of optimized data was required to be recalled.

Thus, a user's write request is forwarded it to the file-system on receipt. After the file-system has finished the write, but before the completion of the write is returned to the user, the partial recall mechanism ensures that the parts corresponding to the recall granularity have also been written to disk.

By way of example, consider a 128K file and with a recall granularity of 64K as generally represented in FIG. 7A. If the user writes 20K of user data at an offset of 70 k, the filter forwards the write to the file-system. After the write, the state of the file is as shown in FIG. 7A (where the user data is labeled 770).

The write is not finished until the partial recall mechanism has patched the remaining part of the range from 64K to 128K with the old data. To this end, the partial recall mechanism holds up the write until the remaining parts of the range are written with data read from the chunk store. This is represented in FIG. 7B, where the user data is labeled 770 and the data read from the chunk store labeled 772A and 772B.

Note that in general, less user data is recalled. For example, in the implementation of FIGS. 5 and 6, 64K is recalled; in the alternative implementation, only (70K−64K)+(128K−90K)=44K is recalled. Once the remaining 44 k is patched up, the write is finished and returned to the user with either a success or an error status.

Consider further the alternative implementation for large write requests, e.g., in which the user's write 774 spans multiple recall boundaries as represented in FIG. 7C. As can be seen, the user's write goes from 70K to 256K. In such a case, only the data from 64K to 70K (block 776) is recalled, (in contrast to having to recall all the data from 64K to 256K).

Figure 8:
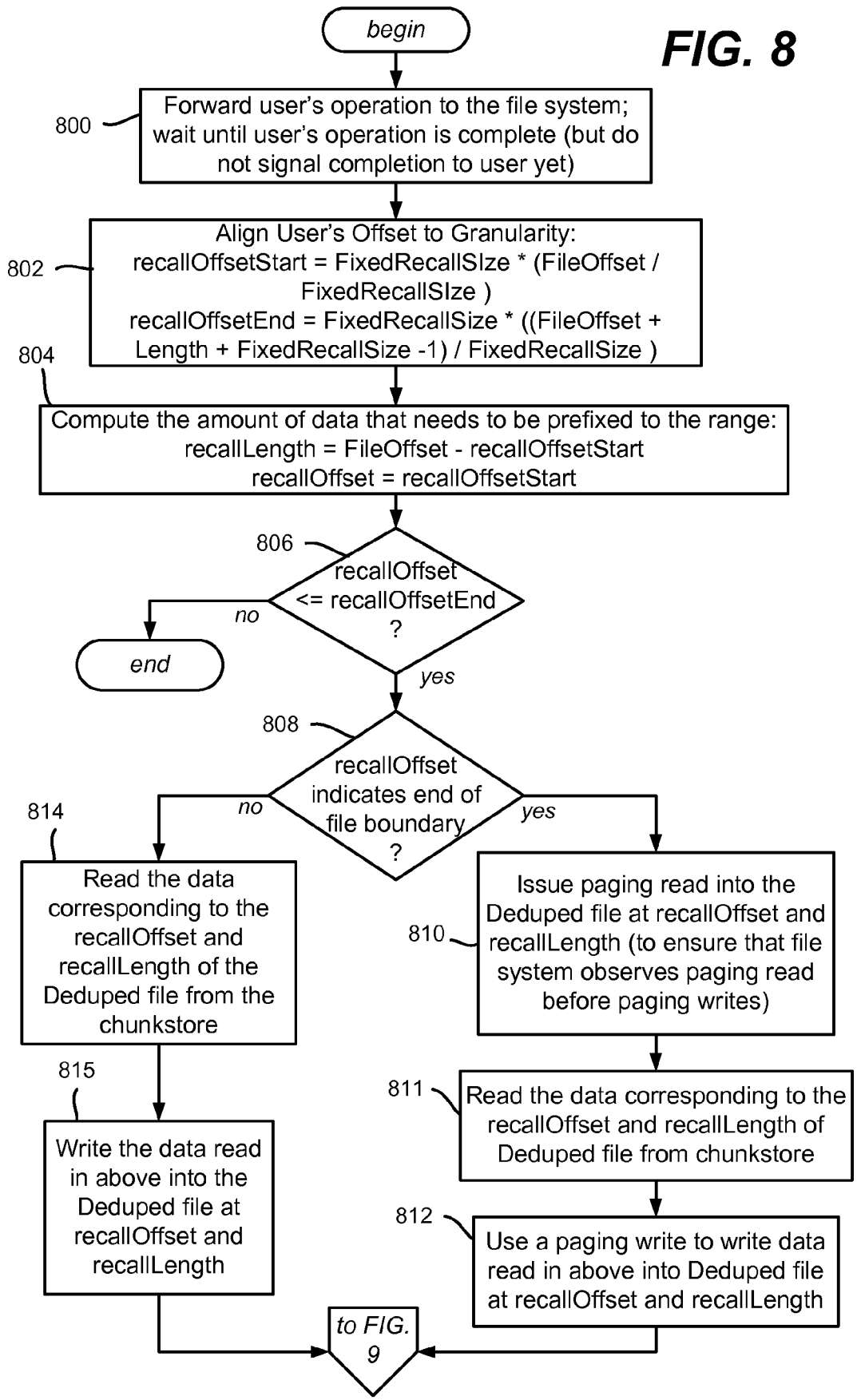
FIGS. 8-10 comprise a flow diagram representing steps of a partial recall algorithm used in an alternative example implementation.
Figure 9:
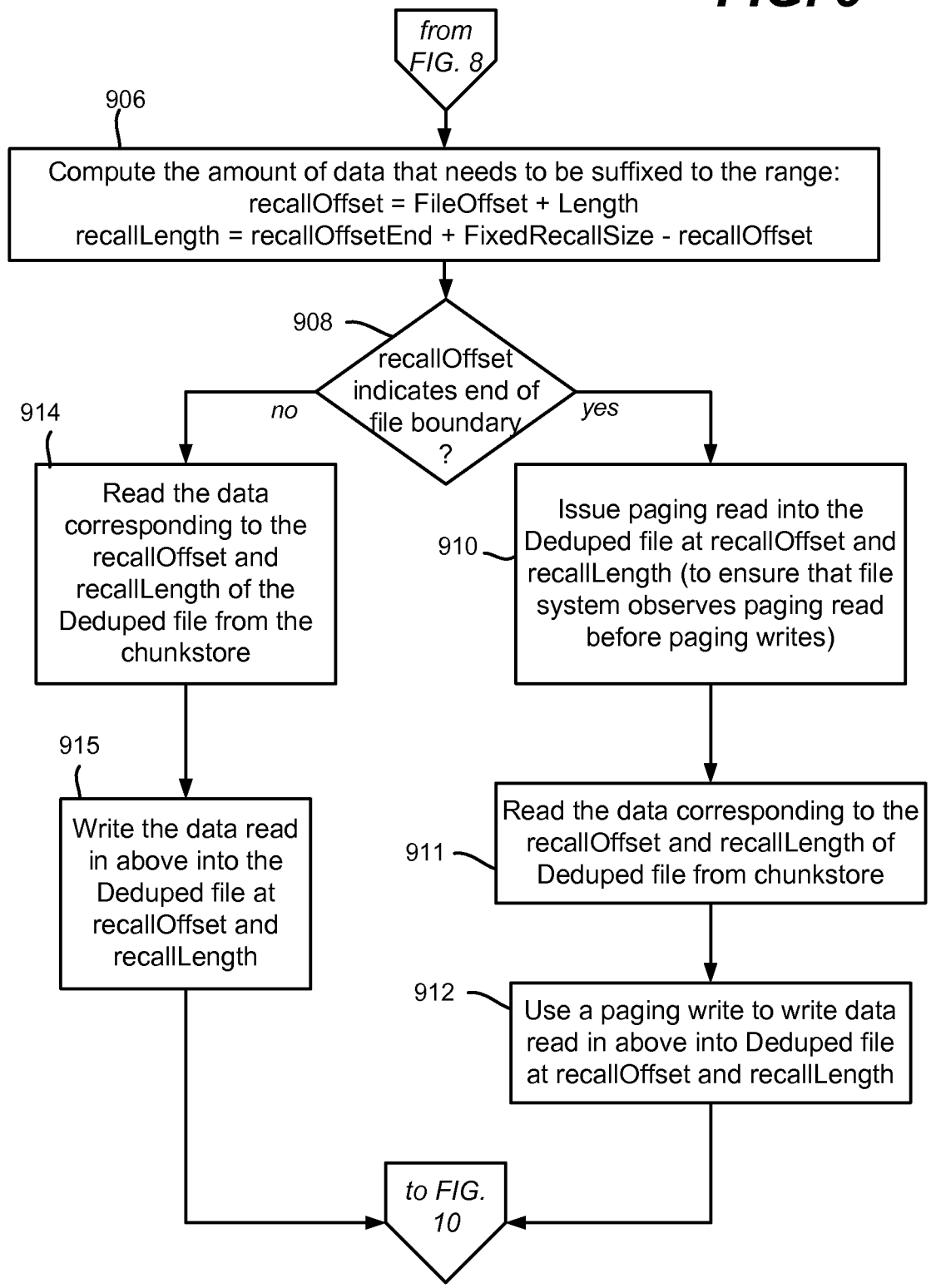
Figure 10:
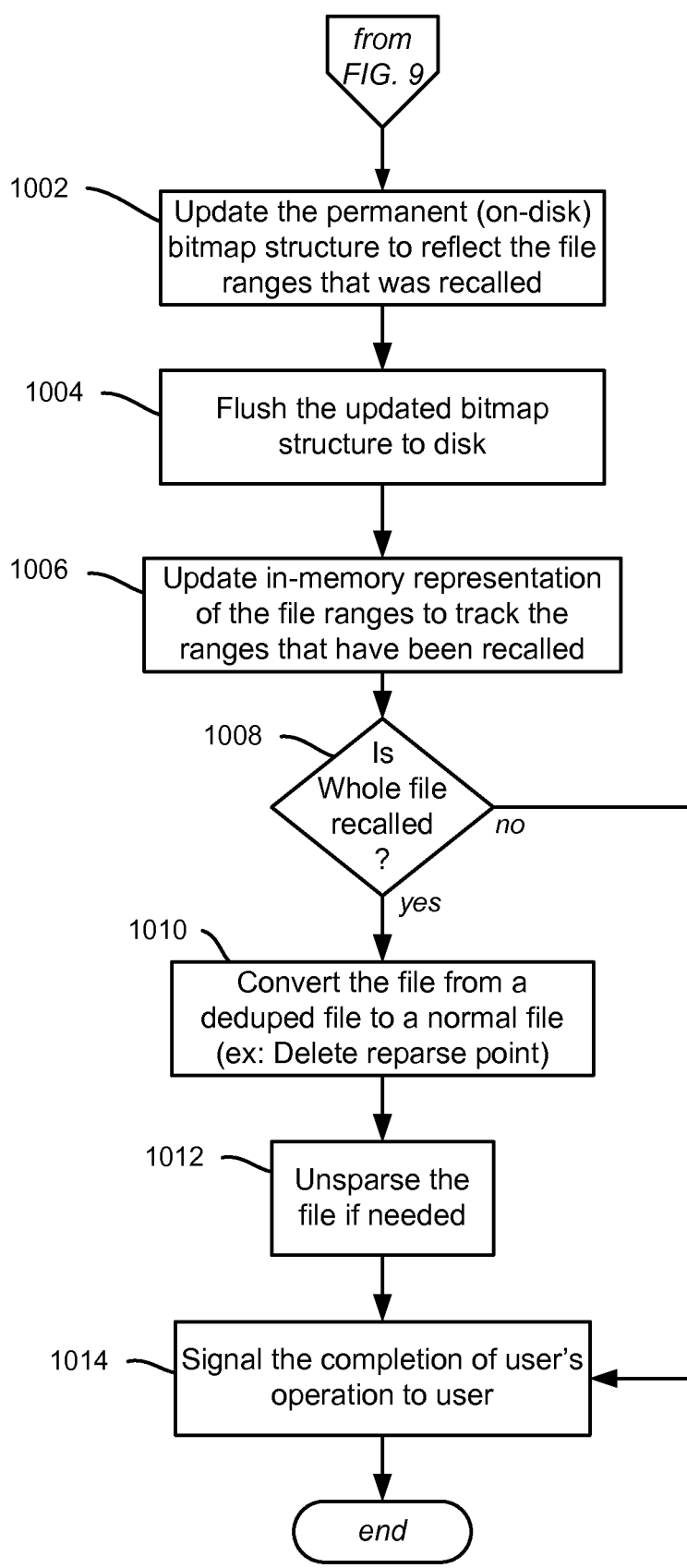

FIGS. 8-10 comprise a flow diagram representing example steps of the above-described alternative implementation of a partial recall mechanism corresponding to FIGS. 7A-7C. Step 800 represents forwarding the operation to the file system and waiting for completion; note that as described above, the completion is not returned to the user until the other data is read and patched up.

Step 802 represents aligning the user's file offset based on the granularity available. Step 804 computes the data read offset and length needed to append a prefix composed of optimized data to the start of the user's modification/write range. This aligns the start of the user's range to the recall boundary. If the start of the user's range already aligns perfectly with the recall boundary then such a prefix is not required. As can be seen, this computation is relative to the user data, and thus is less than all of the data. Note that step 806 in this example ends the process if the recall offset is less than or equal to the recall offset end.

Steps 808, 810-812, 814 and 815 are analogous to steps 508, 510-512, 514 and 515 and are thus not described in detail again for purposes of brevity. Note that these steps only recall the optimized data corresponding to the starting part of the range. A similar operation needs to be done for the ending part of the range. The steps in FIG. 9 highlight the steps required to recall the optimized data corresponding to the ending part of the range.

Step 904 computes the data read offset and length needed to append a suffix composed of optimized data to the end of the user's modification/write range. This aligns the end of the user's range to the recall boundary. If the end of the user's range already aligns perfectly with the recall boundary then such a suffix is not required. Steps 908, 910-912, 914 and 915 are analogous to steps 508, 510-512, 514 and 515 and are thus not described in detail again for purposes of brevity.

The steps of FIG. 10 are mostly analogous to those of FIG. 6, except for step 1014 which completes the write back to the user application. At this time, the data has been recalled into the file using the alternative implementation in which only those parts of the optimized data that bring the recalled parts of the file in line with the fixed size recall boundary are retrieved.

Thus, alternative implementations are available. Note that these (and any other) alternative implementations may be used alone or in combination, depending upon the need for performance and/or any file-system restrictions.

As can be seen, there is described a technology for partially recalling file ranges of deduplicated files based on modify-ranges (user writes) or other criteria. Latency and I/O are reduced by adjusting recalled ranges based on modify-range, chunk alignments and file-system ranges. To this end, a bitmap structure may be used track recalled ranges, possibly configured via encoding and compression techniques. The technology also addresses partial recall performance enhancements to deal with cached/non-cached I/O, reducing file-system flushes, and end-of-file issues. Still further, the technology provides the ability to re-optimize a partially-recalled file by tracking its state so as to only enumerate and stream only the partially-recalled file ranges for re-deduplication.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 11:
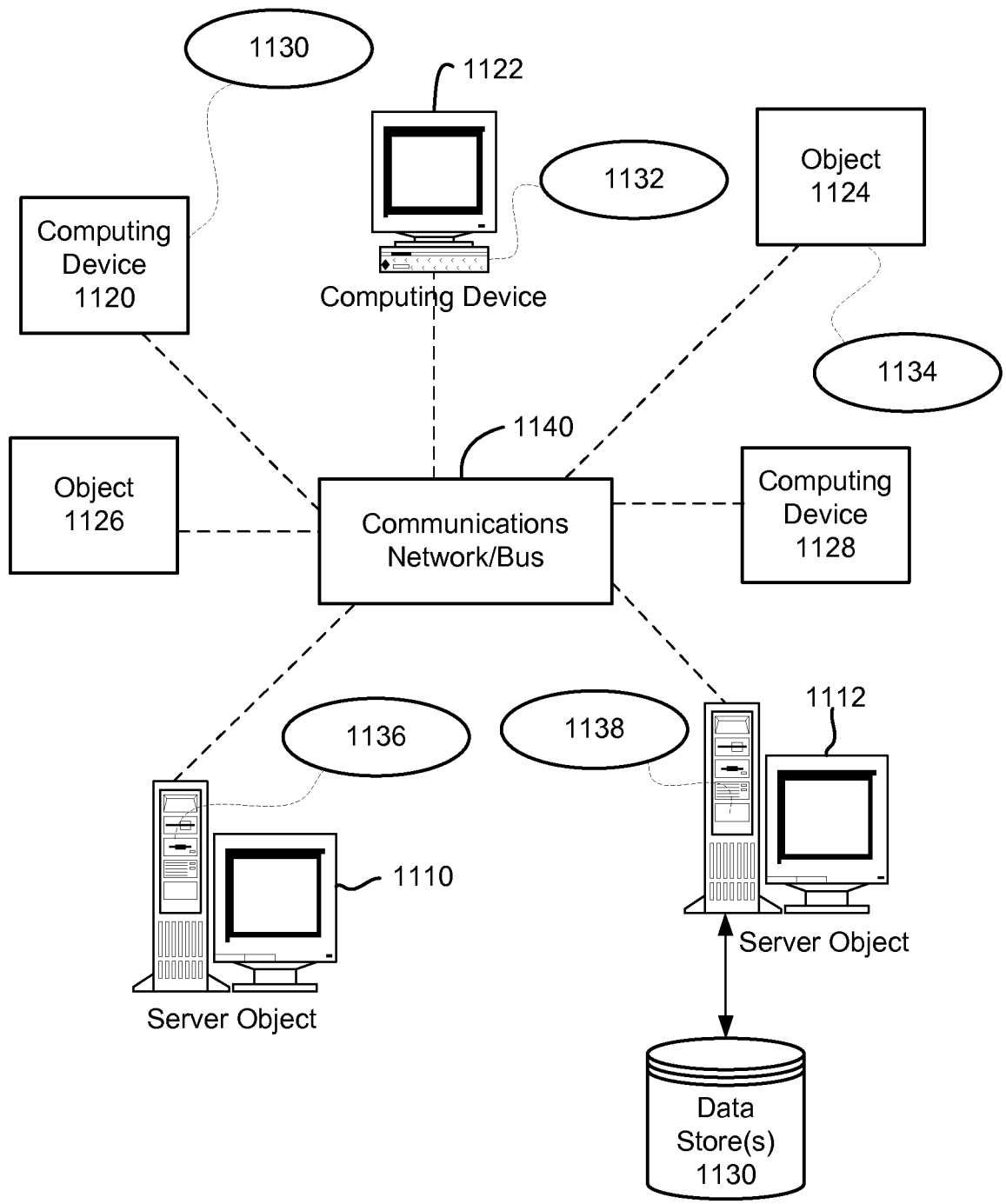
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc., and computing objects or devices 1120, 1122, 1124, 1126, 1128, etc., which may include programs, methods, data stores, programmable logic, etc. as represented by example applications 1130, 1132, 1134, 1136, 1138. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, communications network 1140 may comprise other computing objects and computing devices that provide services to the system of FIG. 11, and/or may represent multiple interconnected networks, which are not shown. Each computing object 1110, 1112, etc. or computing object or device 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1140 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 12 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
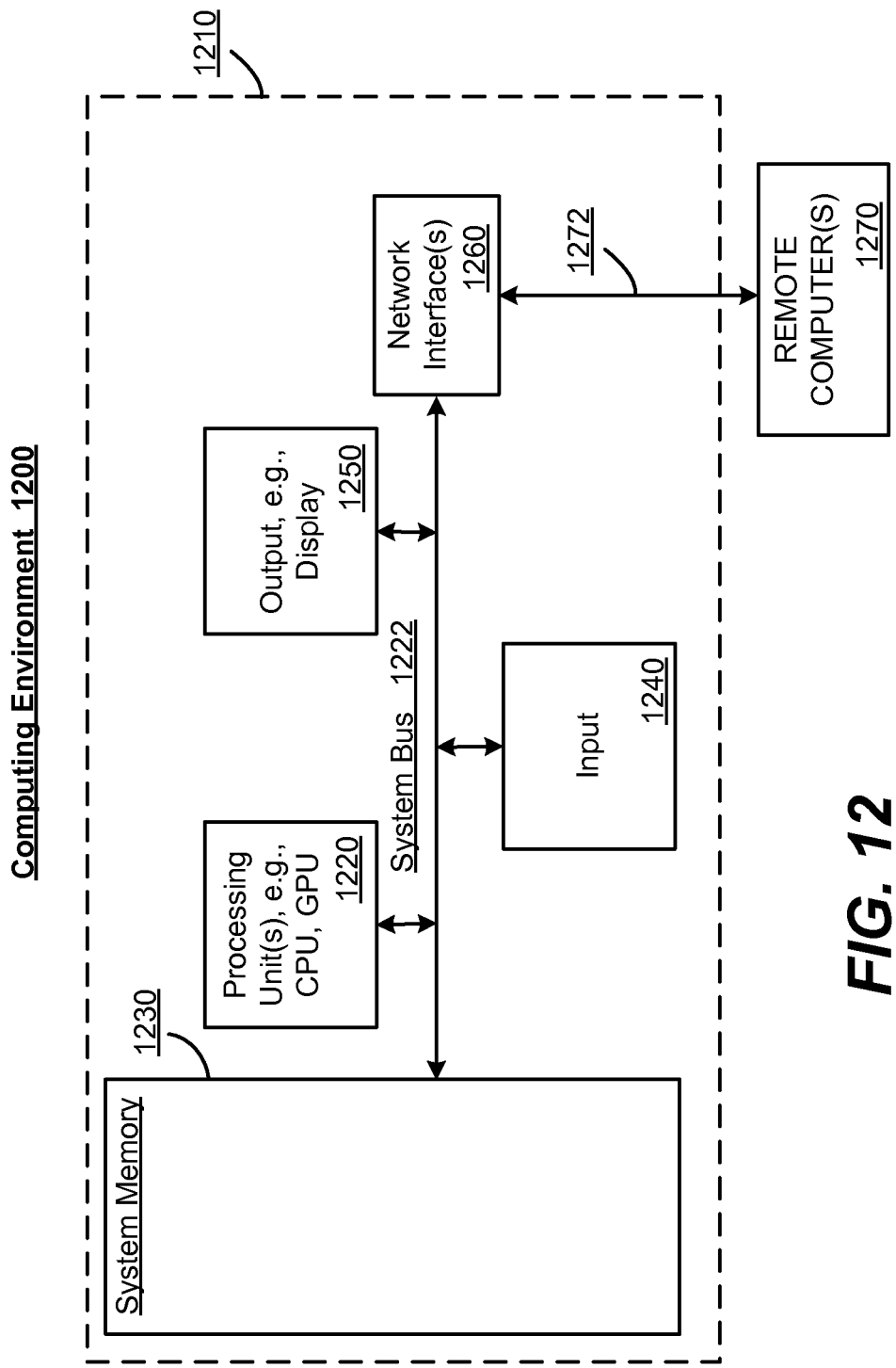
FIG. 12 is a block diagram representing an exemplary non-limiting computing system or operating environment in which one or more aspects of various embodiments described herein can be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the exemplary computing system environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising, changing a state of a file of a storage volume from a fully deduplicated state to a partially deduplicated state, including reading from a chunk store one or more chunks of the file's data, committing at least part of the one or more chunks to a stable storage as one or more recalled ranges of data of that file, and maintaining information in association with the file that tracks which range or ranges of data have been recalled, and which range or ranges of data reside in the chunk store.

2. The method of claim 1 wherein changing the state comprises recalling the one or more ranges of data for modification by a program or user write.

3. The method of claim 1 wherein reading from the chunk store obtains more data than is needed to satisfy a request, and wherein committing comprises writing the data that is needed to satisfy the request plus additional data to fill space allocated by the file system up to beginning and ending allocation boundaries.

4. The method of claim 1 wherein reading from the chunk store obtains one or more chunks than are needed to satisfy a request, and wherein committing comprises writing the chunks that are needed to satisfy the request plus additional data from one or more unneeded chunks to fill space allocated by the file system up to beginning and ending allocation boundaries.

5. The method of claim 1 wherein the file is divided into partitions corresponding to the recalled ranges and the ranges that reside in the chunk store, and wherein maintaining the information in association with the file comprises maintaining a bitmap-related structure in an auxiliary structure associated with that file, the bitmap-related structure having data that indicates whether each partition corresponds to a recalled range or corresponds to a range that resides in the chunk store.

6. The method of claim 5 further comprising, updating the bitmap-related structure after a recalled range is committed, and committing the file to commit the bitmap-related structure after updating.

7. The method of claim 5 further comprising, representing a plurality of partitions with a single bit in the bitmap structure.

8. The method of claim 5 further comprising, compressing the data of the bitmap structure.

9. The method of claim 8 further comprising, reading at least one chunk into the file as a recalled chunk to increase compression efficiency.

10. The method of claim 1 further comprising receiving write data, and wherein reading from the chunk store comprises obtaining zero or more bytes of data before the write data as needed to append data to the request with respect to one recall boundary, and obtaining zero or more bytes of data after the write data up as needed to append data to the request with respect to another recall boundary.

11. The method of claim 1 further comprising receiving a write request comprising write data, providing the write request to the file system, waiting for the write request to complete at the file system, obtaining zero or more bytes of data before the write data as needed to append data to the request with respect to one recall boundary, and obtaining zero or more bytes of data after the write data up as needed to append data to the request with respect to another recall boundary, committing the write data and any appended data to the stable storage, and updating the information that tracks which range or ranges of data have been recalled.

12. The method of claim 1 further comprising, changing the state of the file from the partially deduplicated state back to a fully deduplicated state, including using the information maintained in association with the file to determine which range or ranges of data reside in the chunk store and do not need to be processed for deduplication.

13. The method of claim 1 further comprising, preparing for committing the recalled data, including detecting an end-of-file boundary, and using a paging I/O write for committing the recalled data so as not to increase file size.

14. In a computing environment, a system comprising at least one processor, a memory communicatively coupled to the at least one processor and including components, comprising, a partial recall mechanism configured to access associated tracking data that indicates which range or ranges of a file have been recalled to the file, and which ranges reside on a chunk store and are referenced by the file, the partial recall mechanism further configured to access one or more chunks of file data in the chunk store, commit one or more ranges corresponding to at least part of the one or more chunks to the file as one or more recalled ranges, and update the tracking data to indicate when a range has been committed as a recalled range.

15. The system of claim 14 wherein the partial recall mechanism is incorporated into a file system filter.

16. The system of claim 14 wherein the tracking data comprises a bitmap-related structure corresponding to a bitmap containing values that indicate whether each range is a recalled range or a range that resides in the chunk store.

17. The system of claim 14 wherein the bitmap-related structure is maintained in a metadata store, or on the file in a reparse point buffer, or on the file in a named stream, or in another file metadata buffer provided by the file system in association with the file.

18. The system of claim 14 wherein the tracking data is accessed during re-deduplication processing to determine whether a range of data already resides as a deduplicated range in the chunk store.

19. One or more computer-readable storage media having computer-executable instructions, which when executed perform steps, comprising: receiving a request to access a range of file data of a file at a given offset, in which at least some of the requested file data resides in a deduplication chunk store; reading from the chunk store, and writing to storage, until at least the range of file data at the given offset is obtained; committing at least part of the file data to the file as one or more partially recalled ranges; updating tracking information that indicates that the one or more partially recalled ranges have been committed to the file; and forwarding the request towards a file system.

20. The one or more computer-readable storage media of claim 19 having further computer-executable instructions comprising, detecting that the entire file data has been recalled to the file, and changing the state of the file to a non-deduplicated file, including deleting the tracking information, and marking the file as non-sparse if the file was not originally a sparse file.

* * * * *